(12) United States Patent
Wagner et al.

(10) Patent No.: US 8,346,046 B2
(45) Date of Patent: Jan. 1, 2013

(54) RELEASE LATCH FOR PRE-TERMINATED CASSETTE

(75) Inventors: Matthew M. Wagner, Park Forest, IL (US); Alan F. Wojcik, Cedar Lake, IL (US); William F. Mirusky, Orland Park, IL (US); Paul B. DuCharme, New Lenox, IL (US); Robert L. Fritz, Elwood, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/117,329

(22) Filed: May 27, 2011

(65) Prior Publication Data

US 2011/0229102 A1 Sep. 22, 2011

Related U.S. Application Data

(60) Division of application No. 12/697,687, filed on Feb. 1, 2010, now Pat. No. 7,962,000, which is a continuation of application No. 11/870,038, filed on Oct. 10, 2007, now Pat. No. 7,689,089.

(60) Provisional application No. 60/954,863, filed on Aug. 9, 2007, provisional application No. 60/829,070, filed on Oct. 11, 2006.

(51) Int. Cl.
*G02B 6/00* (2006.01)
(52) U.S. Cl. ........................................................ 385/135
(58) Field of Classification Search ................... 385/135
See application file for complete search history.

(56) References Cited

U.S. PATENT DOCUMENTS

| 4,343,528 | A | 8/1982 | Lucius et al. |
| 4,655,521 | A | 4/1987 | Thomas |
| 4,846,565 | A | 7/1989 | Swanson et al. |
| 5,046,811 | A | 9/1991 | Jung et al. |
| 5,333,221 | A | 7/1994 | Briggs et al. |

(Continued)

FOREIGN PATENT DOCUMENTS

EP 0355639 A2 2/1992

(Continued)

OTHER PUBLICATIONS

Cable Network Components Division, Fujikura Technical Review, No. 100, pp. 19-24, Apr. 2001.

*Primary Examiner* — Ryan Lepisto
(74) *Attorney, Agent, or Firm* — Robert A. McCann; Christopher S. Clancy; James H. Williams

(57) ABSTRACT

A release latch for a pre-terminated cassette is described. The pre-terminated cassette includes a release latch to allow removal of the pre-terminated cassette from a patch panel, where the patch panel includes a retaining feature for retaining the pre-terminated cassette. The release latch includes a cantilever beam located on the sidewall of the pre-terminated cassette. The cantilever beam has a hinge point that allows the beam to deflect with respect to the sidewall. The release latch further includes a depressing tab provided at the distal end of the cantilever beam and a latch tab protruding from the surface of the cantilever beam between the hinge point and the depressing tab. The latch tab is capable of engagement with the retaining feature of the patch panel when the cassette is installed in the patch panel.

13 Claims, 19 Drawing Sheets

U.S. PATENT DOCUMENTS

| | | | |
|---|---|---|---|
| 5,370,541 A | 12/1994 | Bossard | |
| 5,647,043 A | 7/1997 | Anderson et al. | |
| 5,804,765 A | 9/1998 | Siemon et al. | |
| 5,836,786 A | 11/1998 | Pepe | |
| 5,902,155 A | 5/1999 | Polgar et al. | |
| 5,987,203 A * | 11/1999 | Abel et al. | 385/51 |
| 6,017,238 A | 1/2000 | Johnston | |
| 6,080,011 A | 6/2000 | Tsao et al. | |
| 6,095,852 A | 8/2000 | Gregory, II | |
| 6,109,978 A | 8/2000 | Stellman et al. | |
| 6,210,216 B1 | 4/2001 | Tso-Chin et al. | |
| 6,305,986 B1 | 10/2001 | Hwang | |
| 6,336,826 B1 | 1/2002 | Kraft | |
| 6,347,715 B1 | 2/2002 | Drozdenko et al. | |
| 6,352,447 B1 | 3/2002 | Ruth | |
| 6,358,091 B1 | 3/2002 | Lo et al. | |
| 6,375,491 B1 | 4/2002 | Durand et al. | |
| 6,497,395 B1 | 12/2002 | Croker | |
| 6,534,709 B2 | 3/2003 | English | |
| 6,537,106 B1 | 3/2003 | Follingstad | |
| 6,547,585 B2 | 4/2003 | Bradley et al. | |
| 6,568,542 B1 | 5/2003 | Chen | |
| 6,600,106 B2 | 7/2003 | Standish et al. | |
| 6,647,197 B1 | 11/2003 | Marrs et al. | |
| 6,690,874 B2 | 2/2004 | Böhme et al. | |
| 6,736,677 B1 | 5/2004 | Lin et al. | |
| 6,796,844 B1 | 9/2004 | Edwards, III | |
| 6,818,834 B1 | 11/2004 | Lin | |
| 6,846,200 B1 | 1/2005 | Hsu | |
| 6,857,900 B2 | 2/2005 | Kleeberger et al. | |
| 6,887,098 B1 | 5/2005 | Luo et al. | |
| 6,916,199 B2 | 7/2005 | Follingstad | |
| 6,925,241 B2 | 8/2005 | Bohle et al. | |
| 6,932,514 B2 * | 8/2005 | Anderson et al. | 385/59 |
| 6,971,909 B2 | 12/2005 | Levesque et al. | |
| 6,974,348 B2 | 12/2005 | Bentley | |
| 6,980,725 B1 | 12/2005 | Swieconek | |
| 7,045,727 B2 | 5/2006 | Chiang et al. | |
| 7,070,459 B2 | 7/2006 | Denovich | |
| 7,091,418 B1 | 8/2006 | Clark et al. | |
| 7,179,119 B2 | 2/2007 | Follingstad | |
| 7,194,181 B2 | 3/2007 | Holmberg et al. | |
| 7,218,827 B2 | 5/2007 | Vongseng et al. | |
| 7,244,131 B1 | 7/2007 | Khemakhem et al. | |
| 7,244,144 B2 | 7/2007 | Follingstad | |
| 7,277,620 B2 | 10/2007 | Vongseng et al. | |
| 7,330,625 B2 | 2/2008 | Barth | |
| 7,346,254 B2 | 3/2008 | Kramer et al. | |
| 7,376,322 B2 | 5/2008 | Zimmel | |
| 7,376,323 B2 | 5/2008 | Zimmel | |
| 7,400,813 B2 | 7/2008 | Zimmel | |
| 2002/0090177 A1 * | 7/2002 | Anderson et al. | 385/60 |
| 2003/0022553 A1 | 1/2003 | Chen et al. | |
| 2003/0092313 A1 | 5/2003 | Schlueter et al. | |
| 2003/0092314 A1 | 5/2003 | Whiteside et al. | |
| 2004/0127099 A1 | 7/2004 | Lin et al. | |
| 2005/0059295 A1 | 3/2005 | Chen et al. | |
| 2005/0142910 A1 | 6/2005 | Levesque et al. | |
| 2005/0178573 A1 | 8/2005 | James | |
| 2005/0185912 A1 | 8/2005 | Levesque et al. | |
| 2005/0281526 A1 | 12/2005 | Vongseng et al. | |
| 2006/0056769 A1 | 3/2006 | Khemakhem et al. | |
| 2006/0093301 A1 | 5/2006 | Zimmel et al. | |
| 2006/0110117 A1 | 5/2006 | Denovich et al. | |
| 2006/0160431 A1 | 7/2006 | Herbst et al. | |
| 2006/0165366 A1 | 7/2006 | Feustel et al. | |
| 2006/0177190 A1 * | 8/2006 | Vongseng et al. | 385/135 |
| 2007/0189692 A1 | 8/2007 | Zimmel et al. | |
| 2008/0089656 A1 | 4/2008 | Wagner et al. | |
| 2008/0219632 A1 | 9/2008 | Smith et al. | |

FOREIGN PATENT DOCUMENTS

| | | |
|---|---|---|
| EP | 1677549 A1 | 7/2006 |
| GB | 2344702 A | 10/1999 |
| GB | 2392565 A | 12/2002 |
| JP | 06059159 | 4/1994 |
| WO | 2005104567 A1 | 11/2005 |
| WO | 2006012389 A1 | 2/2006 |

* cited by examiner

RELEASE LATCH FOR PRE-TERMINATED CASSETTE

CROSS-REFERENCE TO RELATED APPLICATIONS

This application is a divisional of U.S. patent application Ser. No. 12/697,687, filed Feb. 1, 2010, which is a continuation of U.S. patent application Ser. No. 11/870,038, filed Oct. 10, 2007, now U.S. Pat. No. 7,689,089, which claims the benefit of U.S. Provisional Patent Application No. 60/954,863, filed Aug. 9, 2007, U.S. Provisional Patent Application No. 60/829,070, filed Oct. 11, 2006. The subject matter of each of the patent applications listed above is incorporated by reference in its entirety.

FIELD OF THE INVENTION

The present invention relates to a pre-terminated cassette and, more particularly, to a release latch for removing a pre-terminated cassette installed in a patch panel.

BACKGROUND OF THE INVENTION

Pre-terminated copper or fiber cable cassettes provide quick and reliable installation of cables to patch panels. The pre-terminated cassettes are assembled according to the customer's specifications prior to shipment. The performance of the cassettes is also verified before shipped to the customer. Therefore, customers installing new data centers or changing existing ones may use pre-terminated cassettes to help minimize data center downtime that is generally associated with in-site cable terminations, testing and installation.

Prior pre-terminated cassettes include a latch or slide arm located on the top of the cassette. Once these cassettes are installed in patch panels, it is often difficult to remove the cassette because the latch is not easily accessible. When a plurality of cassettes are installed in the patch panels in a data center, it is difficult to disengage the latch and remove the pre-terminated cassette because the customer is required to reach between rows of cables to disengage the latch. Thus, there is a need for a pre-terminated cassette having a release mechanism that is easily accessible and facilitates its removal from a patch panel.

SUMMARY OF THE INVENTION

A release latch for a pre-terminated cassette for installation into a patch panel is described. The pre-terminated cassette includes a release latch to allow removal of the cassette from a patch panel, where the patch panel includes a retaining feature for retaining the cassette. The release latch includes a cantilever beam located on a sidewall of the pre-terminated cassette. The cantilever beam has a hinge point that allows the beam to deflect with respect to the sidewall. The release latch further includes a depressing tab provided at the distal end of the cantilever beam and a latch tab protruding from the surface of the cantilever beam. The latch tab is located between the hinge point and the depressing tab. The latch tab is capable of engagement with the retaining feature of the patch panel when the cassette is installed in the patch panel.

Preferably, each sidewall of the pre-terminated cassette has the release latch. Further, the latch tab and the retaining feature of the patch panel may have shapes complementary to one another. Various complementary shapes may be used, so long as the latch tab and retaining feature may engage with each other.

The latch tab is preferably capable of inward deflection when the depressing tab is pushed inwardly with respect to the sidewall of the cassette. The latch tab may disengage from the retaining feature of the patch panel when the latch tab is deflected inwardly.

In a preferred embodiment, the pre-terminated cassette includes a grip surface extending from the sidewall of the pre-terminated cassette and located adjacent to the depressing tab. For example, the grip surface may be a wall extension located at the rear of the pre-terminated cassette. The grip surface may provide a user with an additional surface to grip while inserting or removing a cassette from a patch panel.

A patch panel for receiving a pre-terminated cassette having the release latch is also described. The patch panel includes a frame having a top and bottom flange. The panel includes a plurality of top panel tabs extending downwardly from the top flange and a plurality of bottom panel tabs extending upwardly from the bottom flange. The patch panel further includes a plurality of side guides having a top slot adapted to receive a top panel tab and a bottom slot adapted to receive a bottom panel tab. The side guide includes a pair of guide latch tabs. The guide latch tabs extend outwardly from the rear end of the side guide and face opposite directions. The guide latch tabs may include the retaining feature of the patch panel. Preferably, the patch panel retains a pre-terminated cassette having a release latch when the cassette is received between adjacent side guides.

In another embodiment, a pre-terminated cassette for installation into a patch panel, where the panel includes a retaining feature for retaining the pre-terminated cassette, comprises a release tab. The release tab has a fixed end connected to the surface of the pre-terminated cassette and a free end extending along a sidewall of the cassette. The release tab further includes a hinge portion located between the fixed end and the free end of the tab. When the tab is depressed inwardly towards the sidewall of the cassette, the free end may interact with the retaining feature of the patch panel to remove the cassette from the patch panel. Preferably, the release tab lodges between the cassette sidewall and the retaining feature thereby deflecting the retaining feature away from the cassette sidewall.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

DETAILED DESCRIPTION

Figure 1:
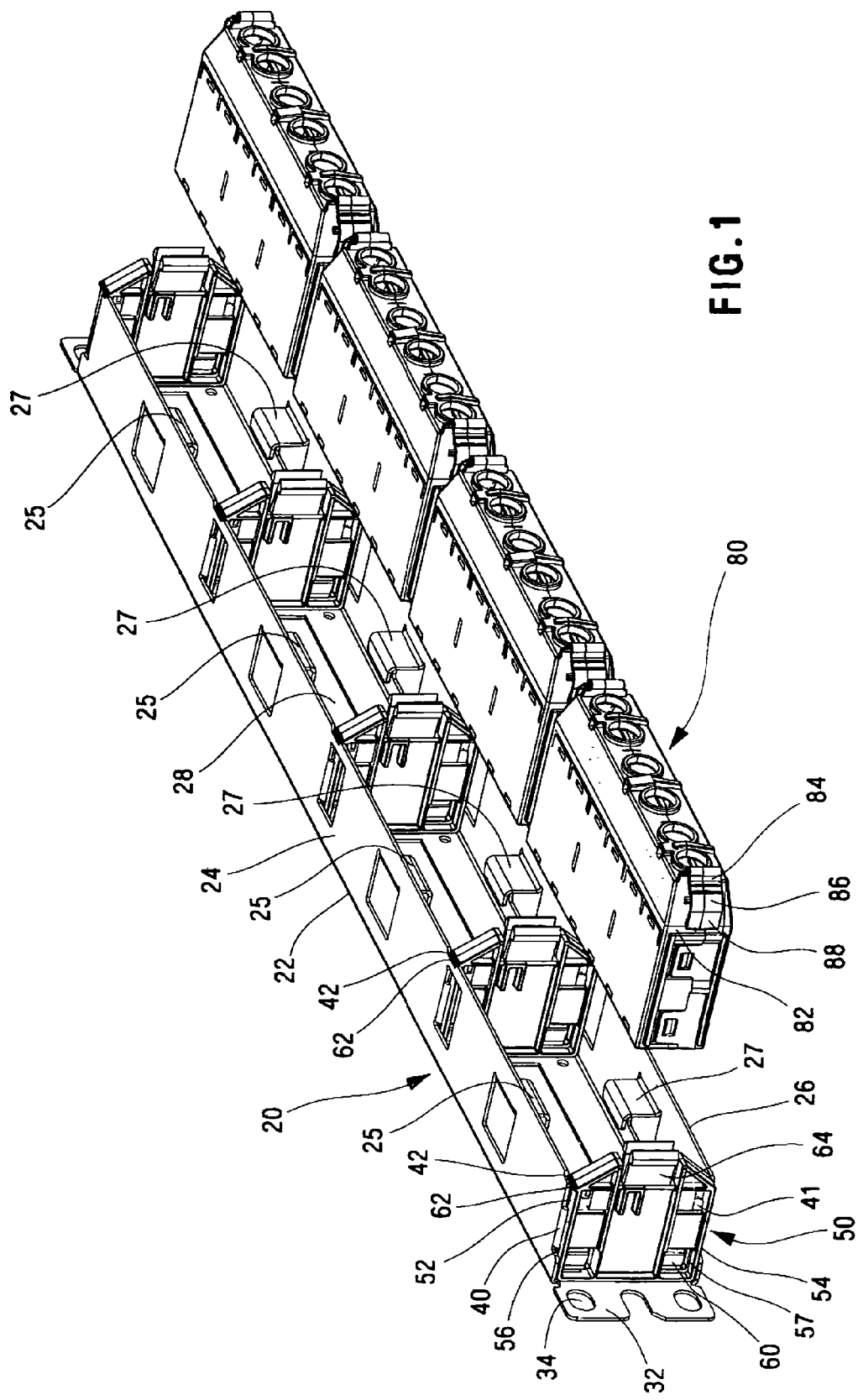
FIG. 1 illustrates a rear perspective view of a patch panel and a number of pre-terminated cassettes with the release mechanism of an embodiment of the present invention.
Figure 2:
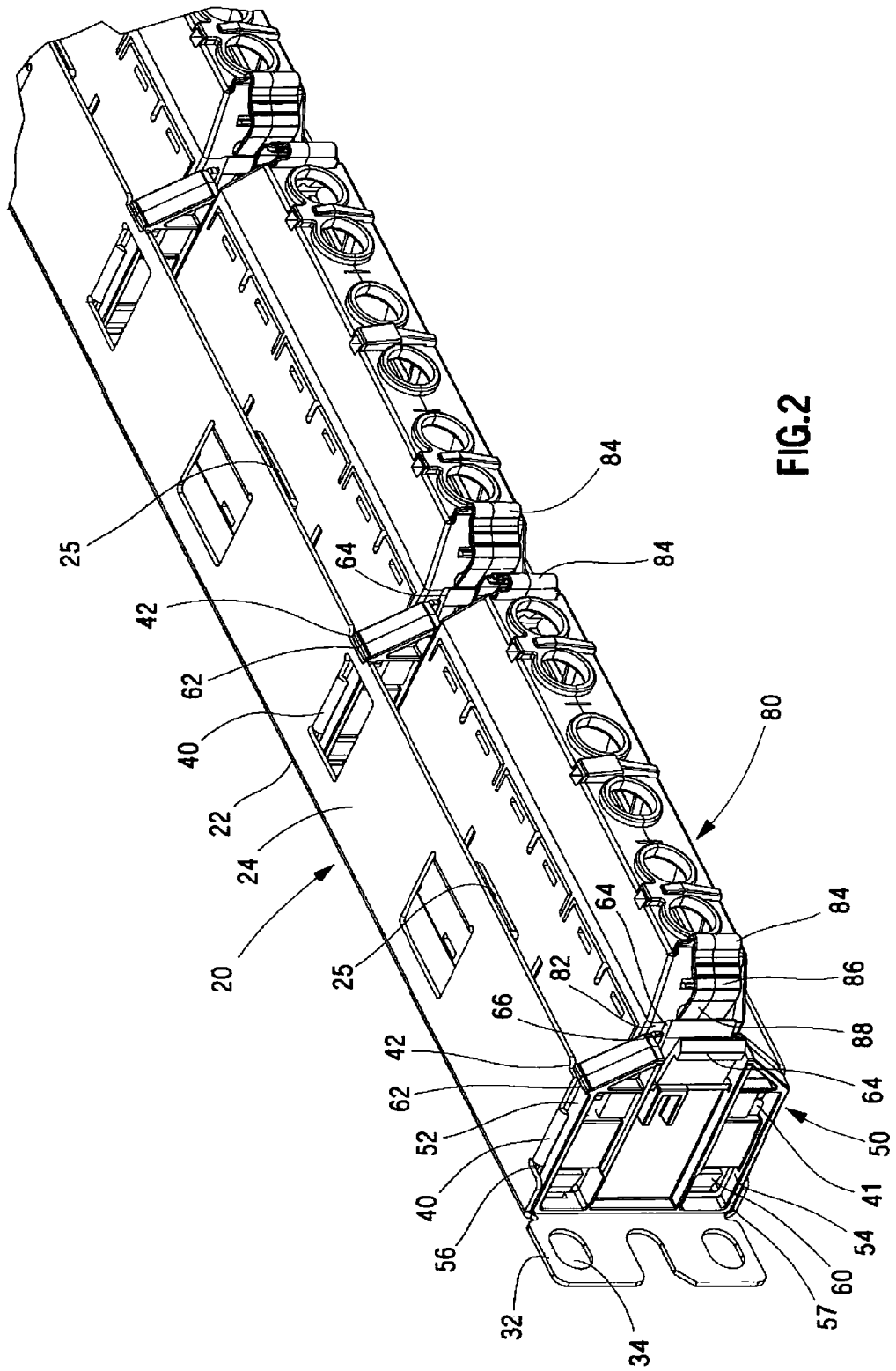
FIG. 2 illustrates a rear perspective view of a number of pre-terminated cassettes in accordance with an embodiment of the present invention installed in the patch panel illustrated in FIG. 1.

FIGS. 1 and 2 illustrate a typical patch panel 20 with a plurality of side guides 50 installed in the patch panel. The patch panel 20 receives a number of pre-terminated cassettes 80 that are positioned between adjacent side guides 50. The pre-terminated cassettes 80 are inserted straight into the patch panel 20 until the cassettes 80 snap into the patch panel between adjacent side guides 50.

Figure 3:
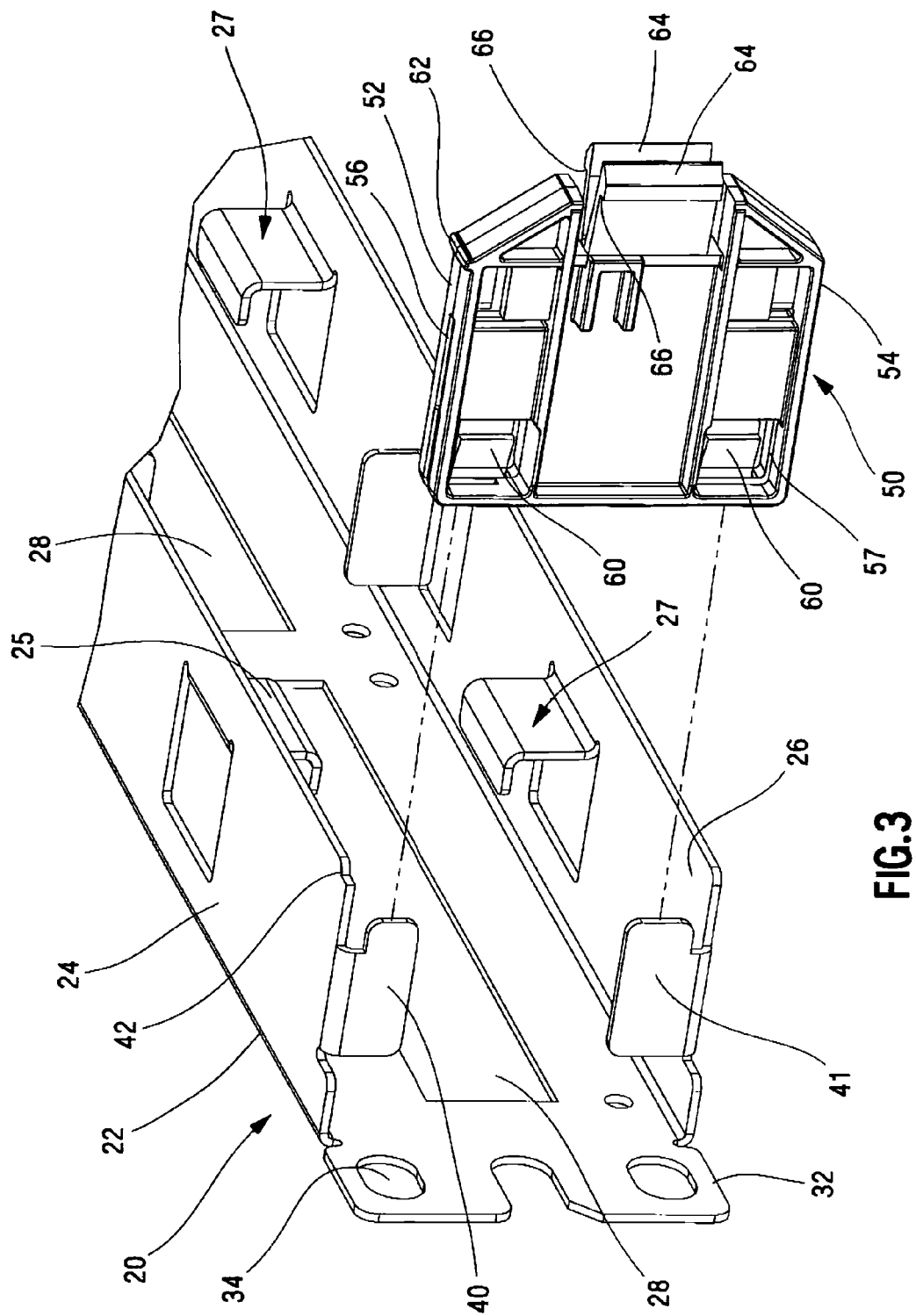
FIG. 3 illustrates an exploded view of the patch panel of FIG. 1 with a side guide positioned to be installed in the patch panel.

FIG. 3 illustrates an exploded view of the patch panel 20 with a side guide 50 of the present invention. The patch panel 20 includes a frame 22 with a top flange 24, a bottom flange 26 and a plurality of openings 28. Each end of the patch panel 20 includes a mounting plate 32 with mounting apertures 34 for securing the patch panel to a network rack (not illustrated).

The patch panel 20 includes a plurality of panel tabs 40, 41. As illustrated in FIG. 3, the panel tabs 40 extend downwardly from the top flange 24 and panel tabs 41 extend upwardly from the bottom flange 26. The panel tabs 40 may be shorter than the panel tabs 41. The panel tabs 40, 41 are located near the end of each opening 28 in the patch panel 20. The top flange 24 of the patch panel 20 also includes a plurality of orientation notches 42. The orientation notches 42 are positioned behind the panel tabs 40 extending from the top flange 24 of the patch panel frame 22.

The top flange 24 and the bottom flange 26 of the patch panel also include a plurality of support flanges 25, 27, respectively. The support flanges 25 and 27 center each pre-terminated cassette and help guide each pre-terminated cassette as the cassettes are installed in the patch panel.

Figure 4:
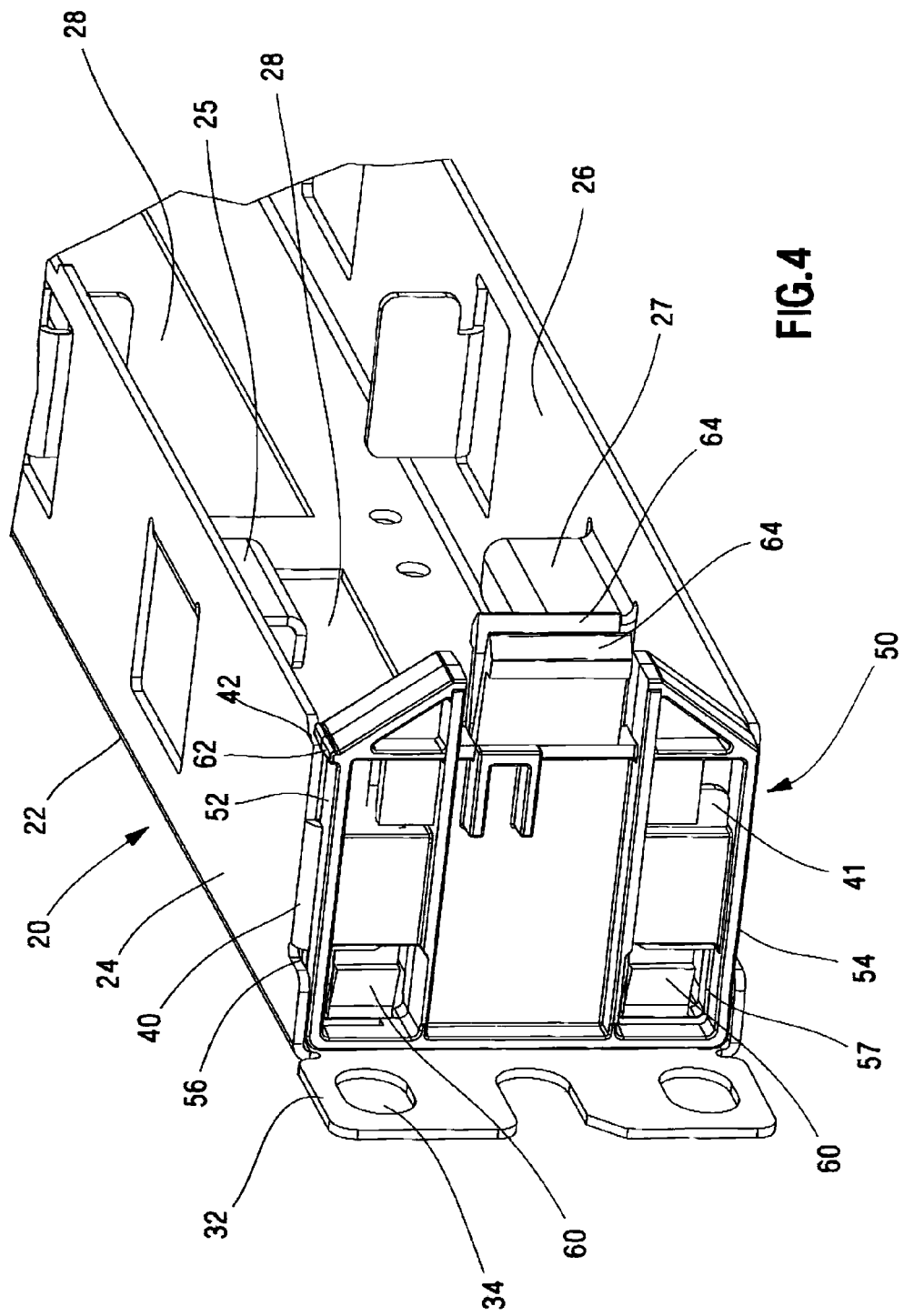
FIG. 4 illustrates a rear perspective view of the patch panel of FIG. 3 with the side guide installed.
Figure 5:
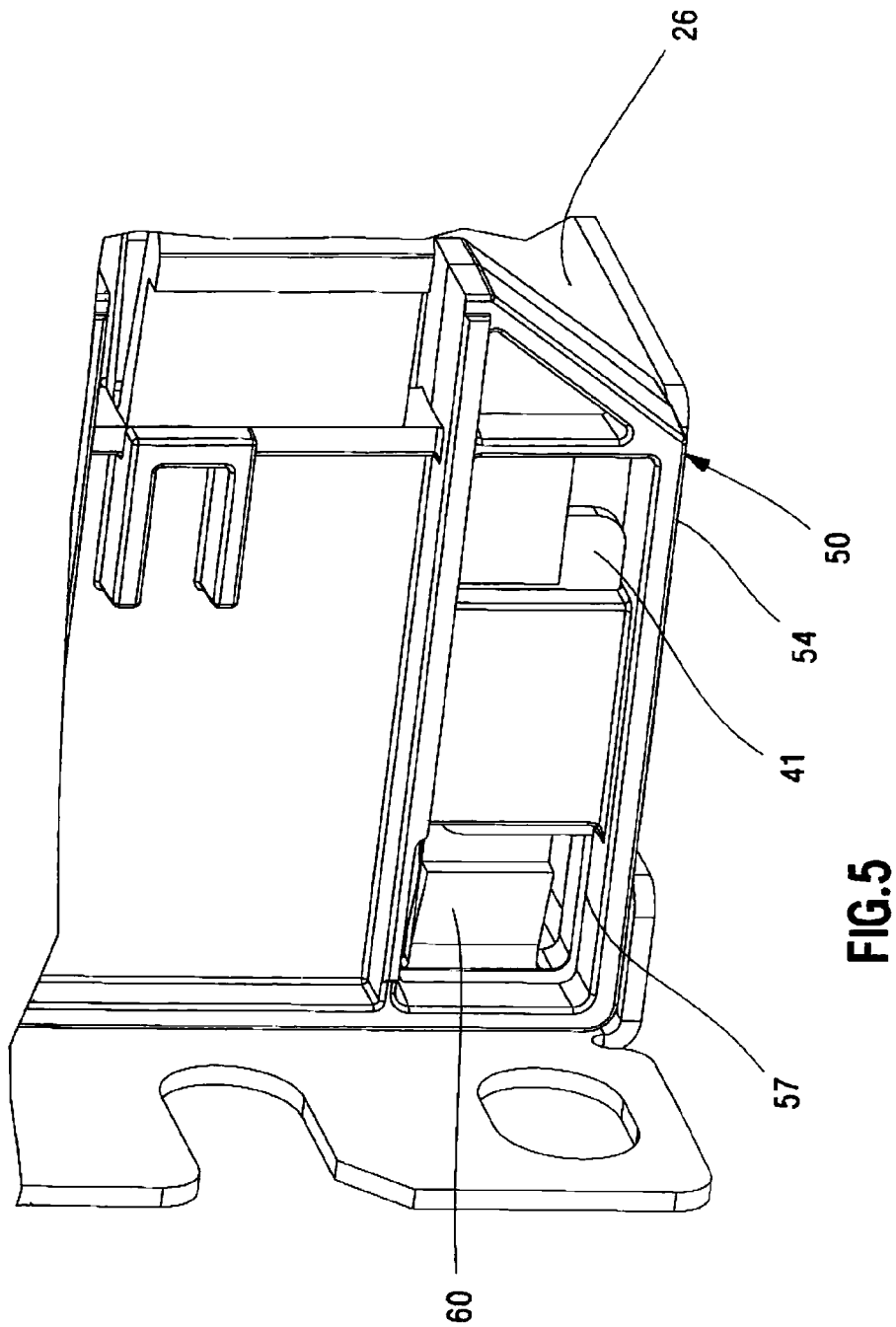
FIG. 5 illustrates a partial side perspective view of the side guide installed in the patch panel illustrated in FIG. 4.

FIG. 3 also illustrates one of the side guides 50 of the present invention before it is installed in the patch panel 20, and FIGS. 4 and 5 illustrate the side guide 50 installed in the patch panel 20. The side guides 50 may include a retaining feature in order to retain a pre-terminated cassette in the patch panel 20. In addition to the support flanges 25 and 27, the side guides 50 guide the pre-terminated cassette 80 so that the cassettes 80 are properly positioned in the patch panel 20. The side guides 50 also ensure that the cassettes 80 are secured to the patch panel 20.

The top 52 and bottom 54 of each side guide 50 includes an opening or slot 56, 57, respectively. As discussed below, when the side guide 50 is installed in the patch panel 20, the slot 56 receives one of the panel tabs 40 and the slot 57 receives one of the panel tabs 41. The side guide 50 also includes guide tabs 60 positioned in the side guide 50 near the top 52 and bottom 54 of the side guide 50. The guide tabs 60 are designed to engage the panel tabs 40, 41 when the side guide 50 is installed in the patch panel 20.

The top 52 of the side guide 50 also includes an orientation tab 62. The orientation tab 62 lines up with the orientation notch 42 in the patch panel 20 to ensure the side guide 50 is properly installed in the patch panel 20. The center of each side guide 50 includes a pair of flexible guide latch tabs 64 that extend outwardly from the back of the side guides 50. The guide latch tabs 64 include a lip 66 that engages the side wall 82 of the pre-terminated cassette 80 (see FIG. 2 and FIGS. 6-9) when installed in the patch panel 20. Alternatively, the guide latch tabs 64 include a lip that engages to the latch tab 128 of the pre-terminated cassette 115 (see FIGS. 12-17) or the latch tab 128 of the pre-terminated, high-density Multi-Fiber Push On (MPO) cable assembly 150 (see FIGS. 18-19) when installed in the patch panel 20.

The side guides 50 are slid into the patch panel 20 so that the panel tabs 40, 41 are positioned in the slots 56, 57, respectively. The panel tabs 40 and the panel tabs 41 are keyed to fit only into slot 56 and slot 57, respectively, to ensure the side guide 50 is properly installed in the patch panel. Once the side guides 50 are slid in the patch panel 20, the guide tabs 60 engage the panel tabs 40, 41. Maintaining the orientation tab 62 so that it is in line with the orientation notches 42 also ensures that the side guide 50 is properly installed in the patch panel 20. As shown in FIG. 4, the side guides 50 are installed in the patch panel 20 so that the side guides 50 are flush with the patch panel frame 22 and the orientation tabs 62 are positioned in the orientation notches 42 in the patch panel 20.

As illustrated in FIGS. 1, 2 and 6-9, the pre-terminated cassette 80 in accordance with an embodiment of the present invention includes a pair of release tabs 84. The release tabs 84 extend from the rear corner of the cassette 80 and are positioned along the side walls 82 of the pre-terminated cassette 80. The release tabs 84 include a hinge portion 86 with a free end 88. The free end 88 extends downwardly toward the cassette side wall 82. The release tabs 84 are similar to the latch arm of the modular plug disclosed in U.S. Pat. No. 5,993,236, assigned to the assignee of the present invention and herein incorporated by reference.

Figure 6:
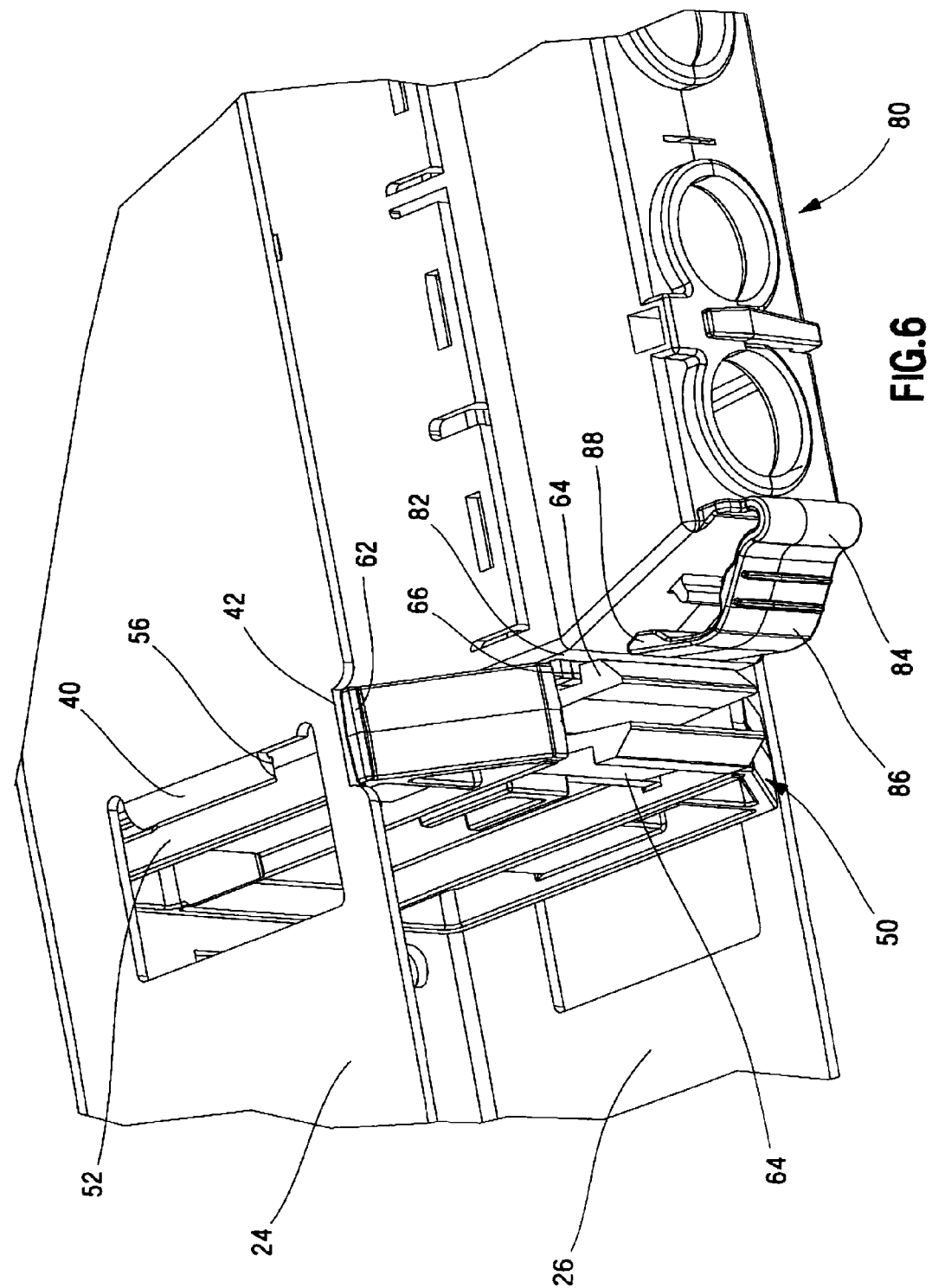
FIG. 6 illustrates a partial rear perspective view of one of the pre-terminated cassettes in accordance with an embodiment of the present invention installed in the patch panel of FIG. 2.
Figure 7:
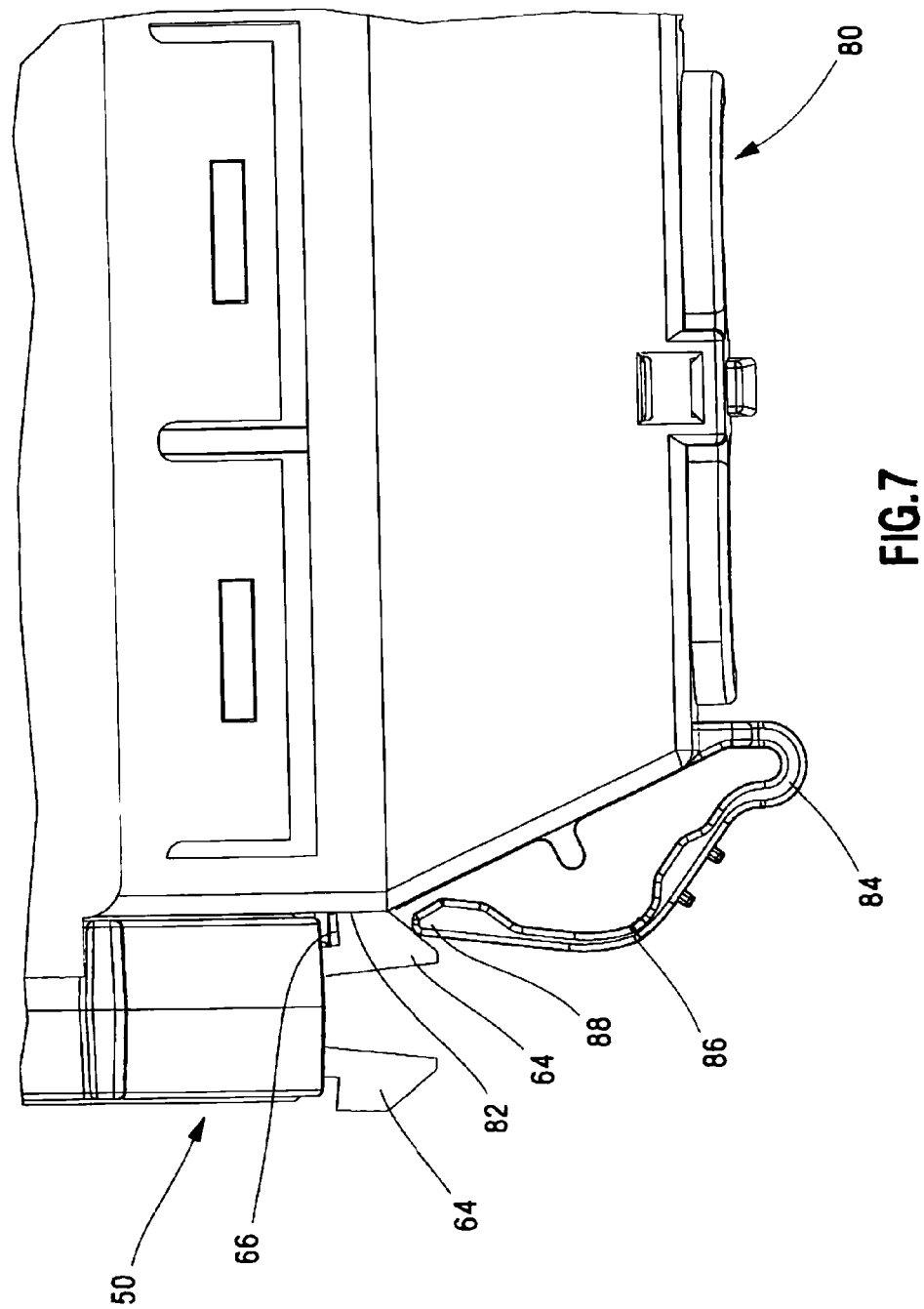
FIG. 7 illustrates a partial top view of the pre-terminated cassette of FIG. 6 installed in the patch panel of FIG. 6.

FIGS. 2, 6 and 7 illustrate the pre-terminated cassette 80 installed in the side guide 50 in the patch panel 20. The lip 66 of the guide latch tab 64 engages the side wall 82 of the pre-terminated cassette 80 to maintain the pre-terminated cassette 80 in the patch panel 20. The release tabs 84 of the pre-terminated cassette 80 are located adjacent to one of the guide latch tabs 64.

Figure 8:
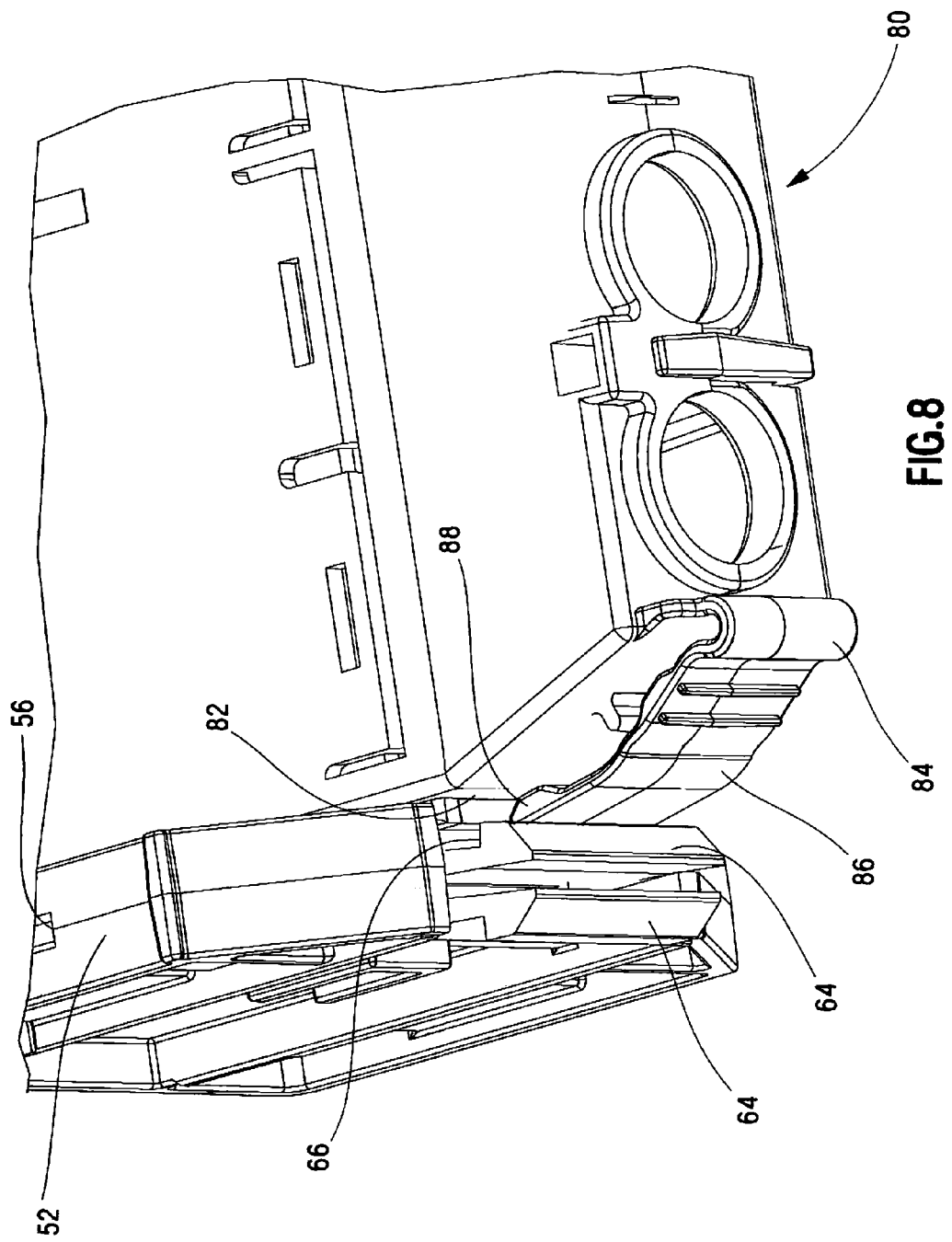
FIG. 8 illustrates a partial rear perspective view of the pre-terminated cassette of FIG. 6 installed in the patch panel of FIG. 6 with the release tabs being depressed.
Figure 9:
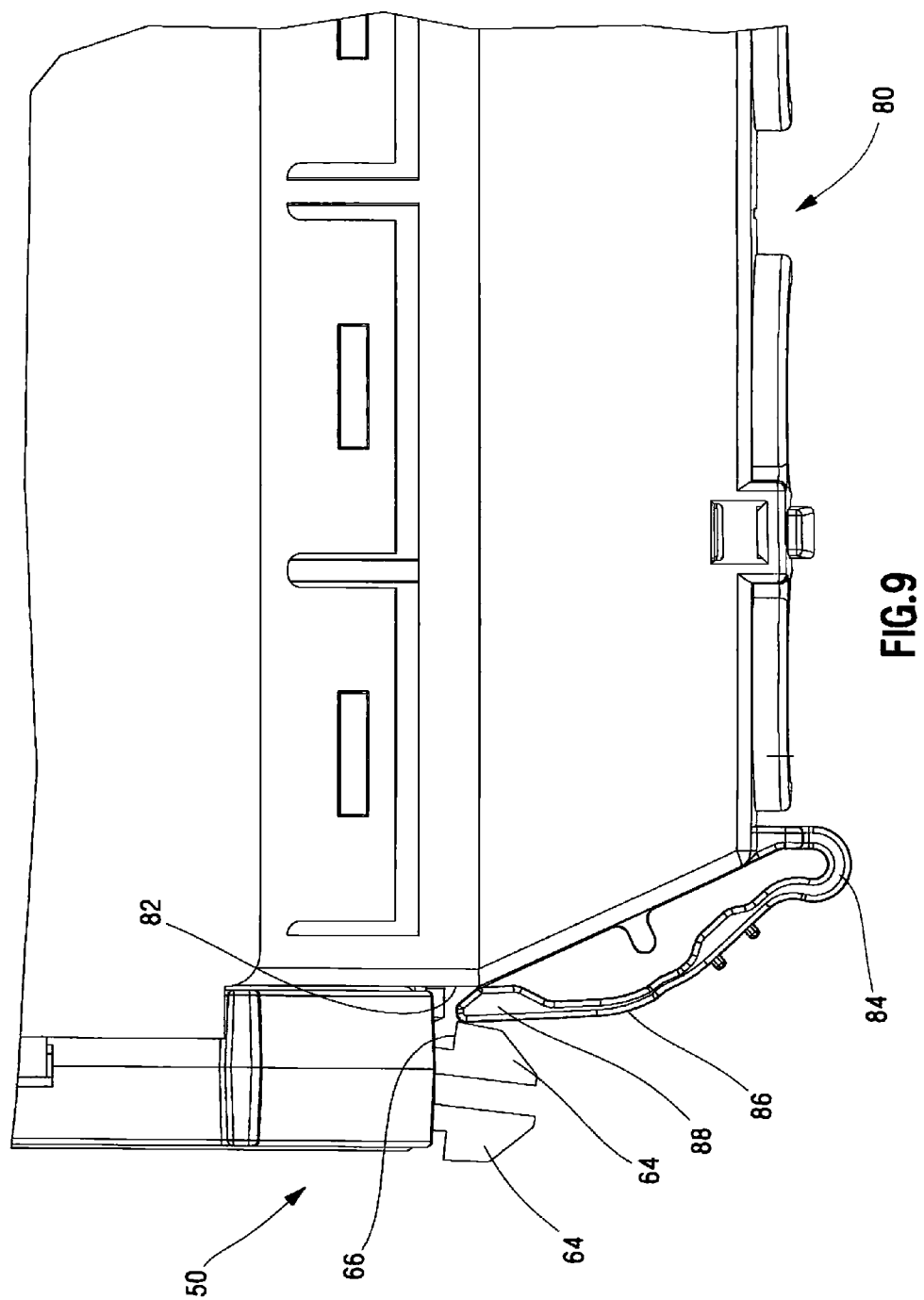
FIG. 9 illustrates a partial top view of the pre-terminated cassette of FIG. 6 installed in the patch panel of FIG. 6 with the release tabs being depressed.

As illustrated in FIGS. 8 and 9, to remove the pre-terminated cassette 80 from the patch panel 20, the release tabs 84 are depressed to begin disengagement of the guide latch tab 64 from the cassette side wall 82. The release tab 84 lodges between the cassette side wall 82 and the guide latch tab 64 thereby displacing the guide latch tabs 64. When the release tab 84 is fully depressed, the guide latch tab 64 clears the side wall 82 of the cassette enabling the pre-terminated cassette 80 to be removed from the patch panel 20.

Figure 10:
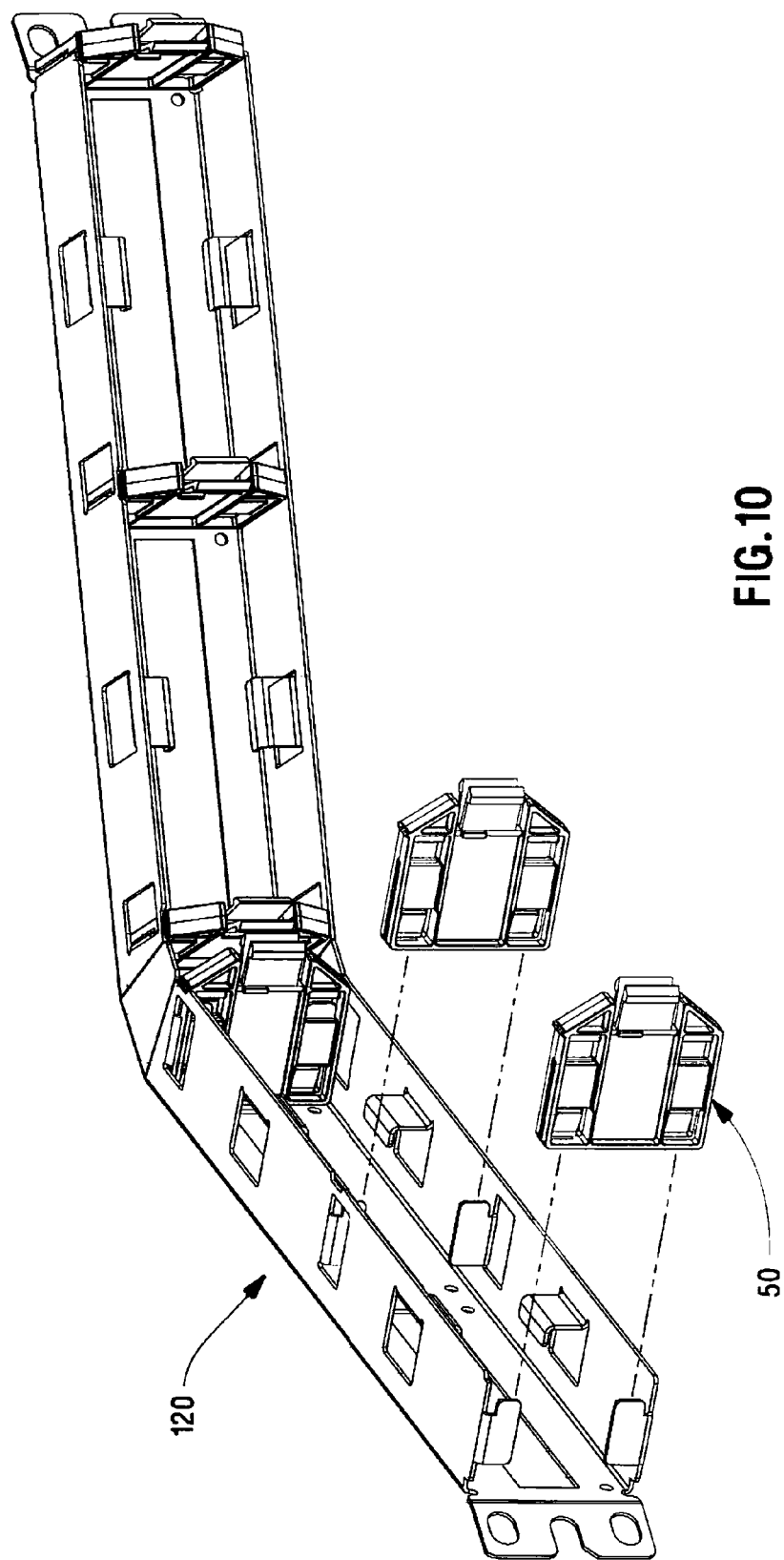
FIG. 10 illustrates an angled patch panel with the side guides of the present invention installed to receive the pre-terminated cassettes.
Figure 11:
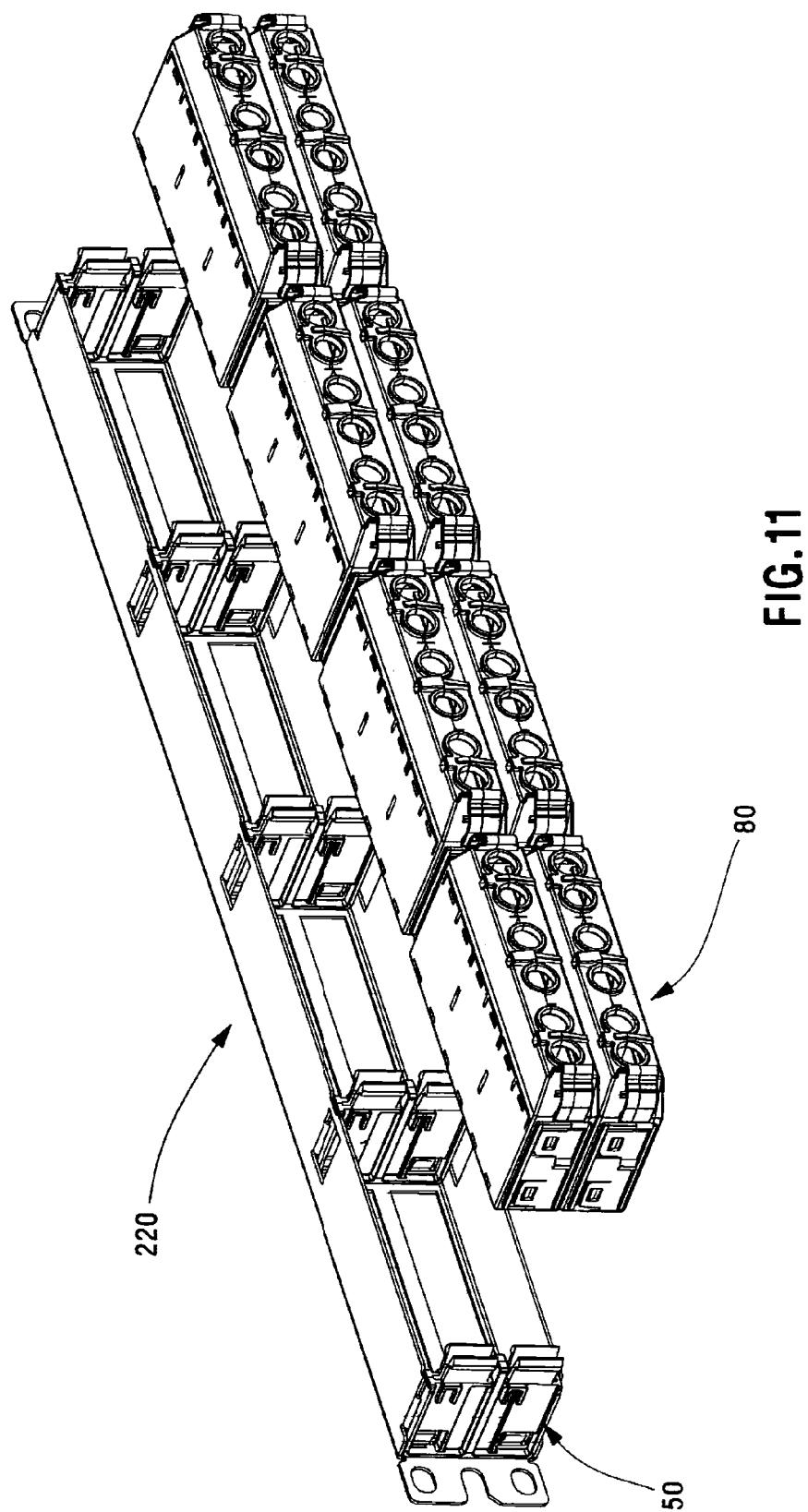
FIG. 11 illustrates a high-density patch panel with the side guides of the present invention installed to receive the pre-terminated cassettes of FIG. 6.

The pre-terminated cassette 80 and the release mechanism of this embodiment of the present invention may also be used with an angled patch panel or with high-density patch panels. For example, FIG. 10 illustrates an angled patch panel 120 with the side guides 50 of the present invention for receiving pre-terminated cassettes 80. FIG. 11 illustrates a high-density patch panel 220 with the side guides 50 of the present invention installed to receive the pre-terminated cassettes 80.

The release mechanism for the pre-terminated cassettes 80 enables the customer to quickly remove a pre-terminated cassette from a patch panel without any tools and with the use of only one hand for any desired moves, additions or changes.

Figure 15:
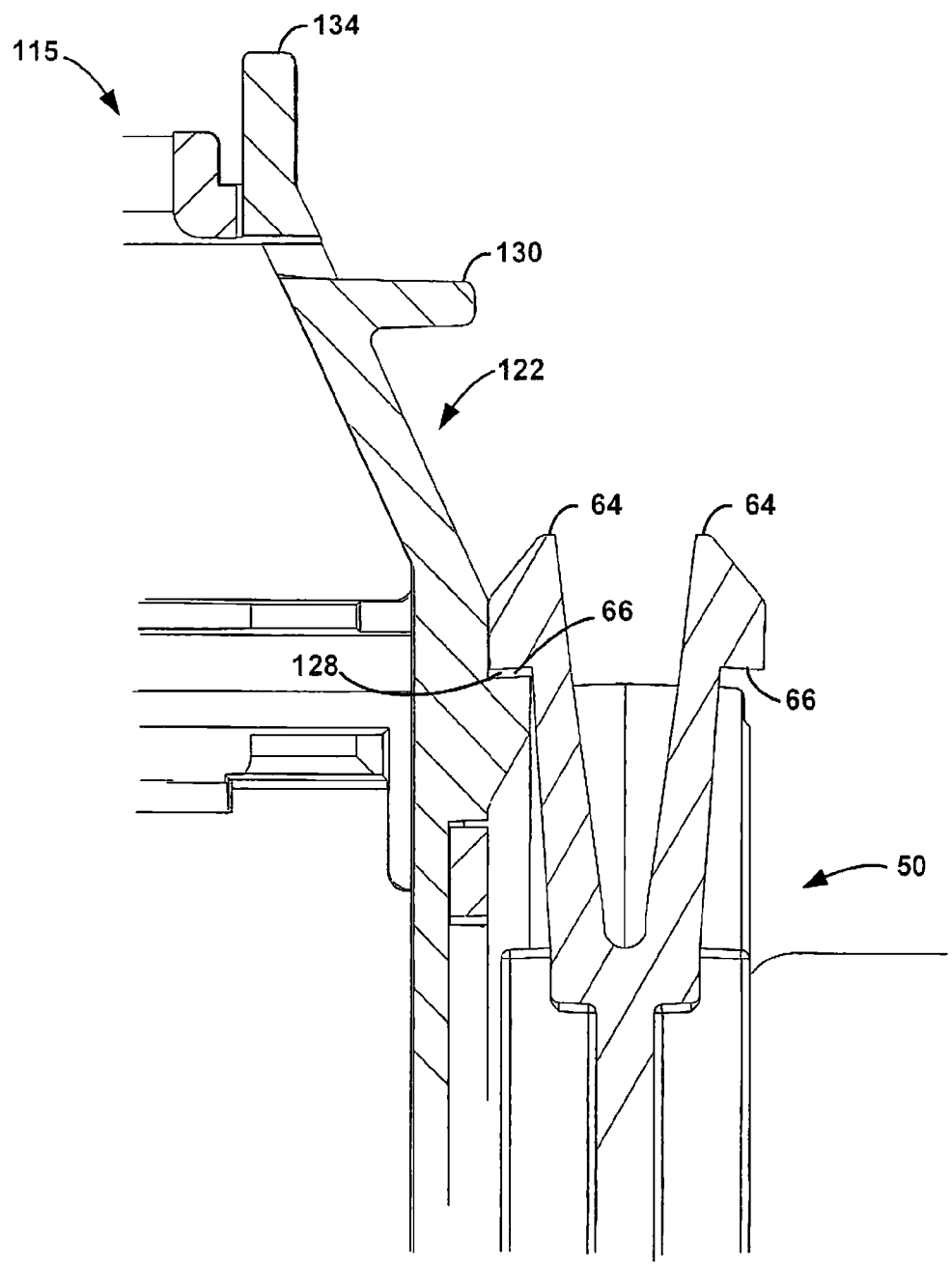
FIG. 15 illustrates a partial top view of the pre-terminated cassette of FIG. 12 installed in the patch panel illustrated in FIG. 4.
Figure 16:
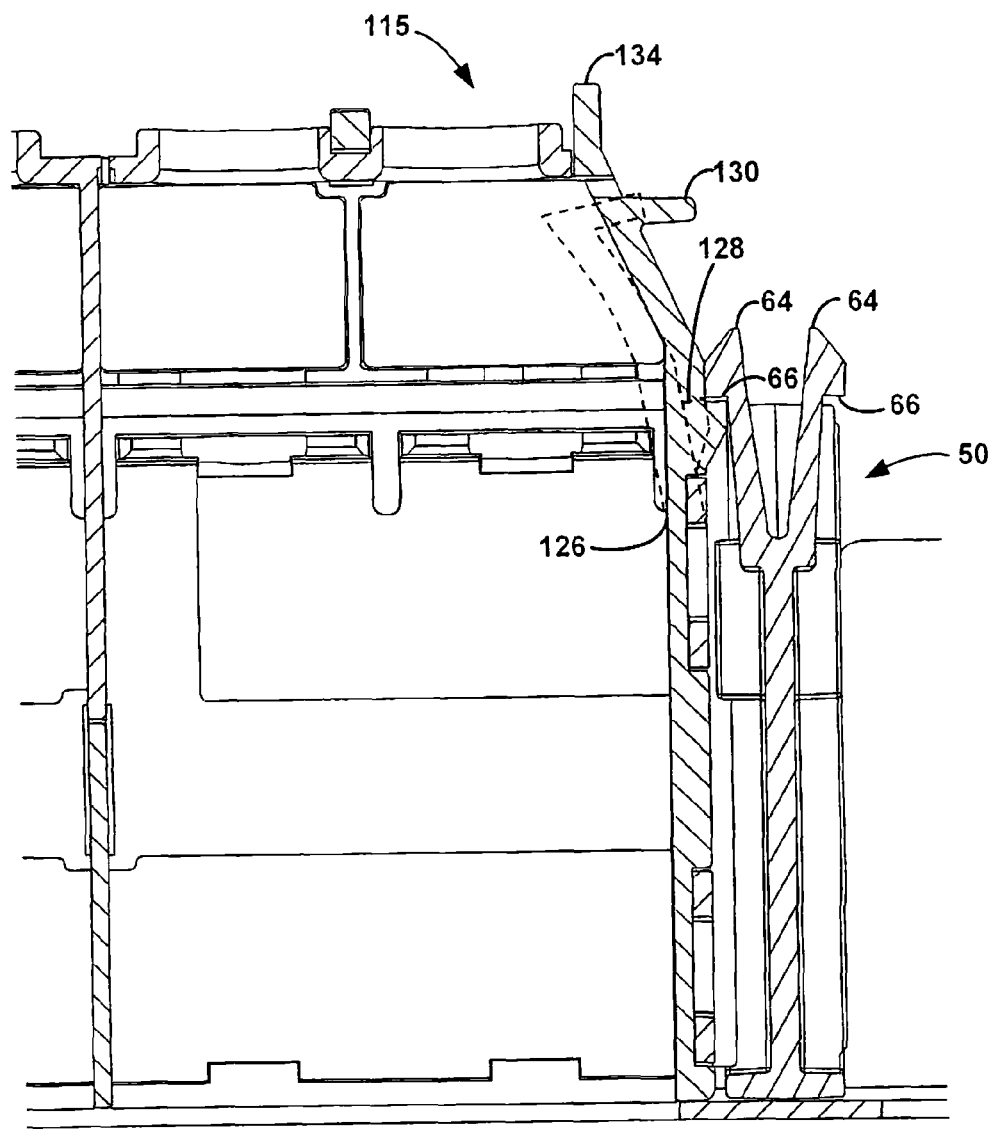
FIG. 16 illustrates a partial top view of the pre-terminated cassette of FIG. 12 with the release latch being depressed.
Figure 17:
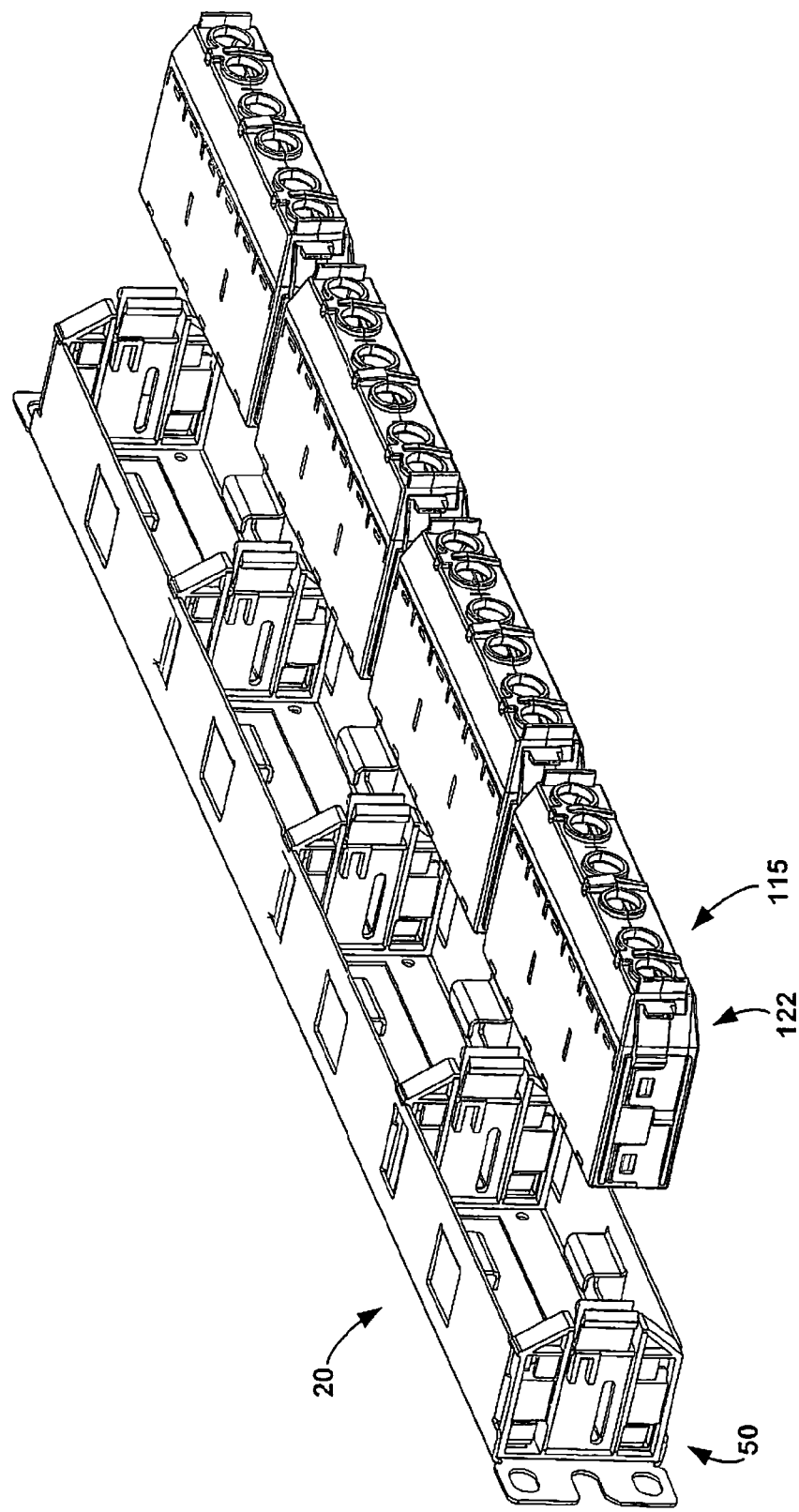
FIG. 17 illustrates a rear perspective view of the patch panel of FIG. 4 and a number of pre-terminated cassettes of FIG. 12 that may be installed in the patch panel.

FIGS. 12-17 illustrate a pre-terminated cassette 115, which is an additional embodiment of the pre-terminated cassette of the present invention. This additional embodiment of the present invention is similar to the pre-terminated cassette 80 described in reference to FIGS. 6-9. For instance, this additional embodiment may be installed in the same patch panel 20 described above that pre-terminated cassette 80 may be installed in. As depicted in FIG. 17, patch panel 20 may receive a number of pre-terminated cassettes 115 such that the pre-terminated cassettes 115 may be positioned between side guides 50. The pre-terminated cassettes 115 may be inserted straight into the patch panel 20 until the cassettes 115 snap into the patch panel between adjacent side guides 50. However, unlike pre-terminated cassette 80, the embodiment depicted in FIGS. 12-17 has a different release mechanism than the release mechanism of pre-terminated cassette 80. The following details the release mechanism of the pre-terminated cassette 115.

Figure 12:
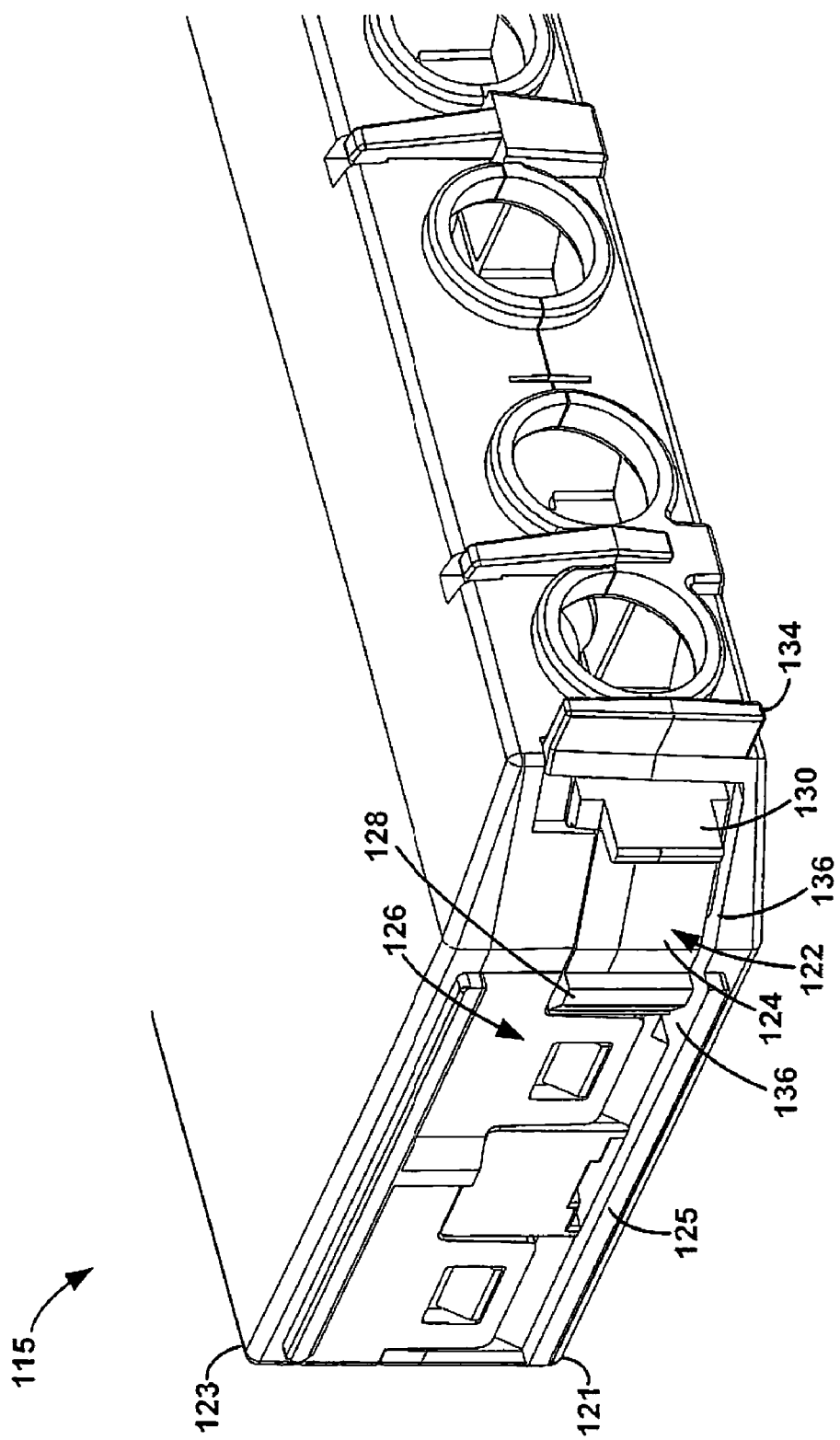
FIG. 12 illustrates a partial rear perspective view of a pre-terminated cassette in accordance with an embodiment of the present invention.
Figure 13:
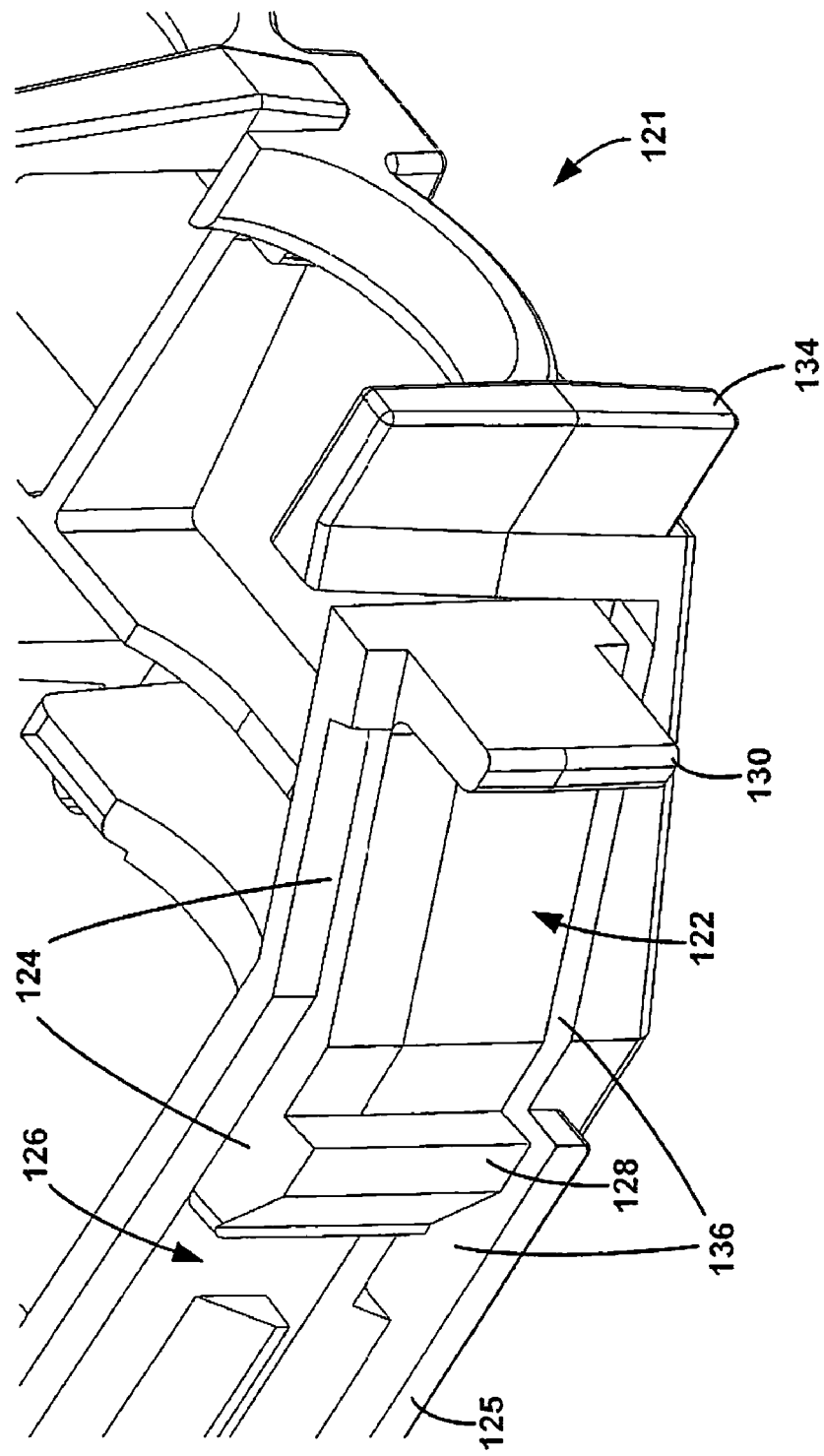
FIG. 13 illustrates a partial rear perspective view the cassette base of the pre-terminated cassette of FIG. 12.
Figure 14:
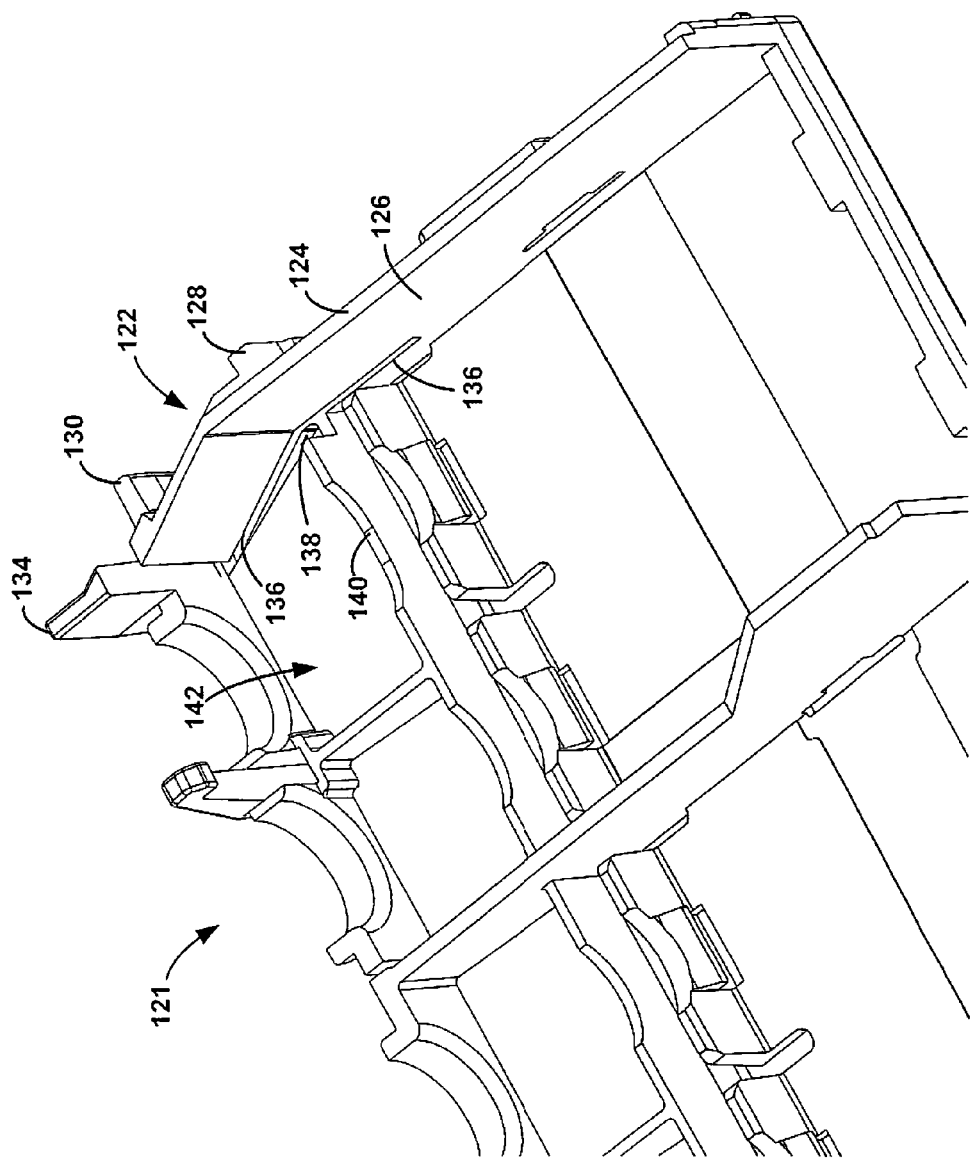
FIG. 14 illustrates a partial perspective view of the cassette base of the pre-terminated cassette of FIG. 12.

FIG. 12 illustrates a partial rear perspective view of the pre-terminated cassette 115. Pre-terminated cassette 115 may have a cassette base 121 and a cassette cover 123. The cassette base 121 includes a release latch 122. Alternatively, the cassette cover 123 could include the release latch. FIGS. 13-14, which are perspective views of the cassette base 121 of the pre-terminated cassette 115, show the release latch 122 in greater detail.

The pre-terminated cassette 115 includes a pair of release latches 122. While FIGS. 12-14 depict partials views of one side of the pre-terminated cassette or the cassette base, it should be understood that the accompanying side has a substantially similar release latch design. The release latch 122 is located at the side wall 125 of the pre-terminated cassette base 121. The release latch 122 is a cantilever beam 124 having a hinge point 126, a latch tab 128, and a depressing tab 130. The cassette base 121 preferably includes a wall extension 134 extending from the edge of the cassette base 121. The wall extension 134 is located at the rear of the cassette base 121 and above the release latch 122.

A slot 136 in the side wall 125 of the pre-terminated cassette base may operate to form the cantilever beam 124. As depicted, the slot 136 is located toward the bottom of the pre-terminated cassette base. The slot may extend from the hinge point 126 to the wall extension 134.

The release latch 122 further includes a latch tab 128. The latch tab 128 may be a protrusion from the cantilever beam 124 of the pre-terminated cassette base 121. The release latch further includes a depressing tab 130. When the depressing tab 130 is depressed inward, the latch tab 128 will move inward because the latch tab 128 is located between the cantilever hinge point 126 and the depressing tab 130. Additionally, the side wall 125 of the cassette base 121 may include a wall extension 134. This wall extension is located at the rear of the cassette base 121 and preferably located above the depressing tab 130. The wall extension preferably operates as a grip surface and may advantageously provide additional grip for a customer when the customer is depressing the depressing tab 130 in order to install or remove a pre-terminated cassette.

In addition, in a preferred embodiment, the pre-terminated cassette base 121 includes a notch 138 in the rib 140 of the interior 142 of the cassette base 121, as shown in FIG. 14. The notch 138 may be located on an interior rib 140 to provide clearance for the release latch 122. Further, the notch 138 may operate as a positive stop for the release latch 122 to prevent excessive deflection of the cantilever beam 124 of the release latch 122. Excessive deflection may cause excessive stress at the hinge point 126 of the cantilever beam. The notch 138 preferably limits the stress at the hinge point 126, which may increase the structural stability and strength of the release latch.

A pre-terminated cassette such as pre-terminated cassette 115 may be easily installed in and removed from the patch panel described above. FIGS. 15 and 16 illustrate the pre-terminated cassette 115 installed in the side guide 50 of the patch panel 20. The lip 66 of the guide latch tab 64 of the patch panel 20 engages the latch tab 128 of the release latch 122 to maintain the pre-terminated cassette 115 in the patch panel 20. For purposes of engaging one another, the guide latch tab 64 and the latch tab 128 have complementary shapes. It should be understood that while FIGS. 15 and 16 depict one example of complementary shapes for the guide latch tab and latch tab, other shapes for the guide latch tab and the latch tab are possible as well, so long as the guide latch tab and the latch tab engage. When the pre-terminated cassette 115 is fully inserted into the patch panel 20, the latch tab 128 may snap and lock behind the guide latch tab 64. When the latch tab 128 engages the guide latch tab 64, the patch panel 20 firmly locks and holds the pre-terminated cassette 115 in place.

Further, the respective latches of the patch panel 20 and the pre-terminated cassette 115 operate to hold the pre-terminated cassette 115 firmly in place in the patch panel in the event of a mechanical load being applied to the pre-terminated cassette. The release latch 122 is preferably a self-energizing latch, such that the latch increases engagement with the patch panel retaining feature as the cassette experiences rearward or side loading. For instance, in the scenario where a rearward and/or a sideward load is applied to the pre-terminated cassette 115, the guide latch tab 64 of the patch panel 20 and the latch tab 128 of the pre-terminated cassette 115 increase engagement. More specifically, rear or side loading on the pre-terminated cassette 115 will cause the guide latch tab 64 and latch tab 128 to engage with each other even more tightly than a scenario of no load. For example, if the cable of a pre-terminated cassette is accidentally pulled, yanked, or twisted, the guide latch tab 64 and the latch tab 128 will increase engagement with each other and the pre-terminated cassette 115 will remain secure in the patch panel 20.

As illustrated in FIG. 16, to remove the pre-terminated cassette 115 from the patch panel 20, the depressing tabs 130 may be depressed to begin disengagement of the guide latch 64 from the latch tab 128 of the pre-terminated cassette. In order to remove the pre-terminated cassette 115 from the patch panel, a customer may grasp the pre-terminated cassette 115 by grasping the wall extension 134 and the depressing tab 130, press the depressing tab inward, and pull the pre-terminated cassette 115 out of the patch panel 20. When the depressing tab is depressed or pushed inward, as indicated in FIG. 16 by the dotted line, the latch tab 128 is also deflected inward. The inward motion of the depressing tab and the latch tab 128 disengages the latch tab from the lip 66 of the guide latch tab 64 of the patch panel 20. The latch tab 128 may clear the lip 66 of the guide latch 64 of the patch panel 20. When the latch tab 128 clears the lip 66 of the guide latch 64, the pre-terminated cassette 115 may be easily removed from the patch panel 20.

As with pre-terminated cassette 80, the pre-terminated cassette 115 and the release latch of this embodiment of the present invention may also be used with an angled patch panel or with high-density patch panels. For example, FIG. 10 illustrates an angled patch panel 120 with the side guides 50 of the present invention that may receive pre-terminated cassettes such as pre-terminated cassette 80 or pre-terminated cassette 115. FIG. 11 illustrates a high-density patch panel 220 with the side guides 50 of the present invention installed to receive the pre-terminated cassettes.

An advantage of this embodiment of the invention is that the pre-terminated cassette 115 requires very little compression to release the latch and disengage the cassette during intentional removal of the cassette from the patch panel. The cantilever beam may be easily deflected upon pressure being applied. Further, as with pre-terminated cassette 80 having latch 84 described above, the release latch 122 for the pre-terminated cassette 115 enables the customer to quickly remove a pre-terminated cassette from a patch panel without any tools and with the use of only one hand for any desired moves, additions, or changes.

Additionally, the wall extension feature of the pre-terminated cassette 115 advantageously provides a convenient structure for a customer to grasp while removing the pre-terminated cassette from a patch panel. The grip allows a customer to avoid the need to grasp the cable of the pre-terminated cassette in order to assist with removal of the cassette from a patch panel. For instance, in the scenario where the pre-terminated cassette 115 is a fiber optic pre-terminated cassette, it is not desired to require the customer to grasp the fiber optic cable to assist with removal of the cassette from the patch panel. If a customer grasps the fiber optic cable to assist with removal, damage may occur to the fiber optic connector terminations or the fibers. The release latch and wall extension described allows a user to easily remove a pre-terminated cassette from a patch panel without the need to grasp the cable to assist with removal.

Figure 18:
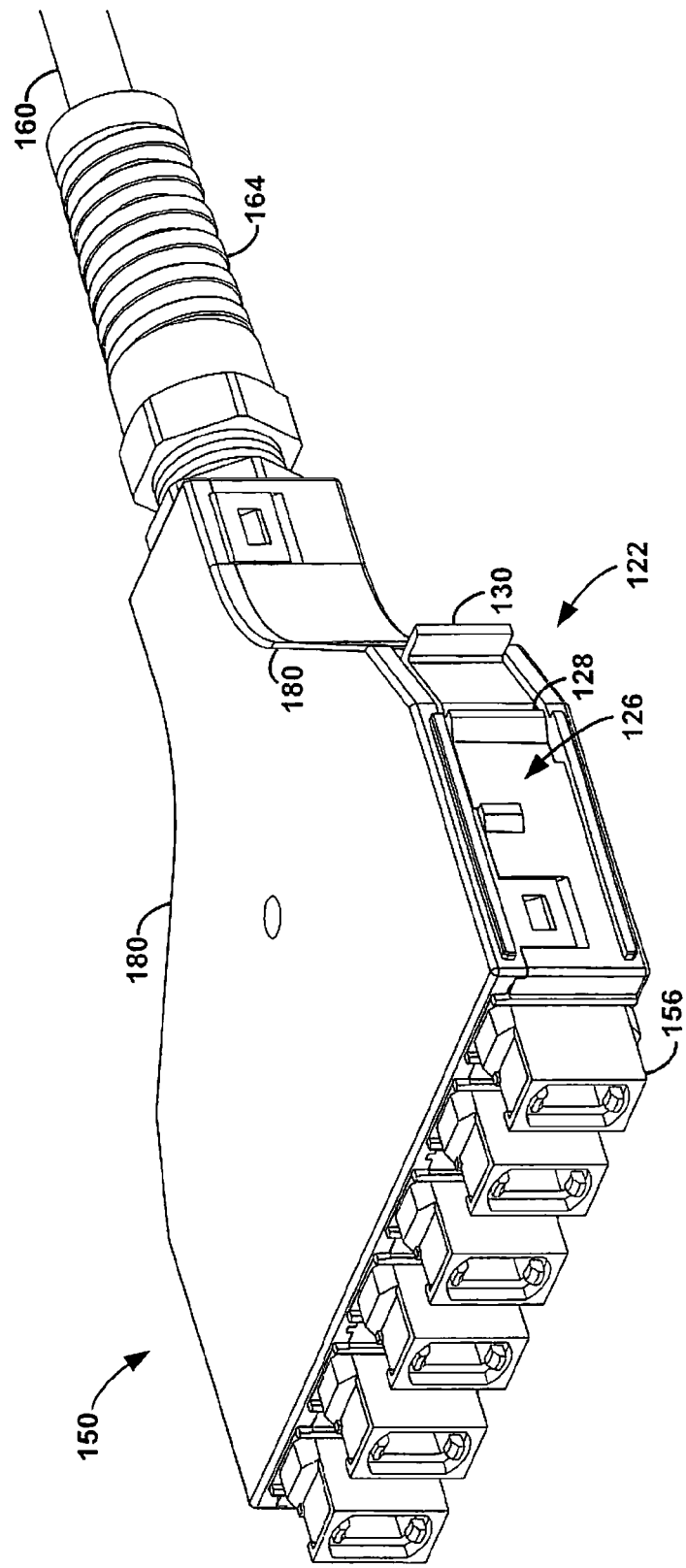
FIG. 18 illustrates a rear perspective view of a pre-terminated, high-density Multi-Fiber Push On (MPO) cable assembly in accordance with an embodiment of the present invention.
Figure 19:
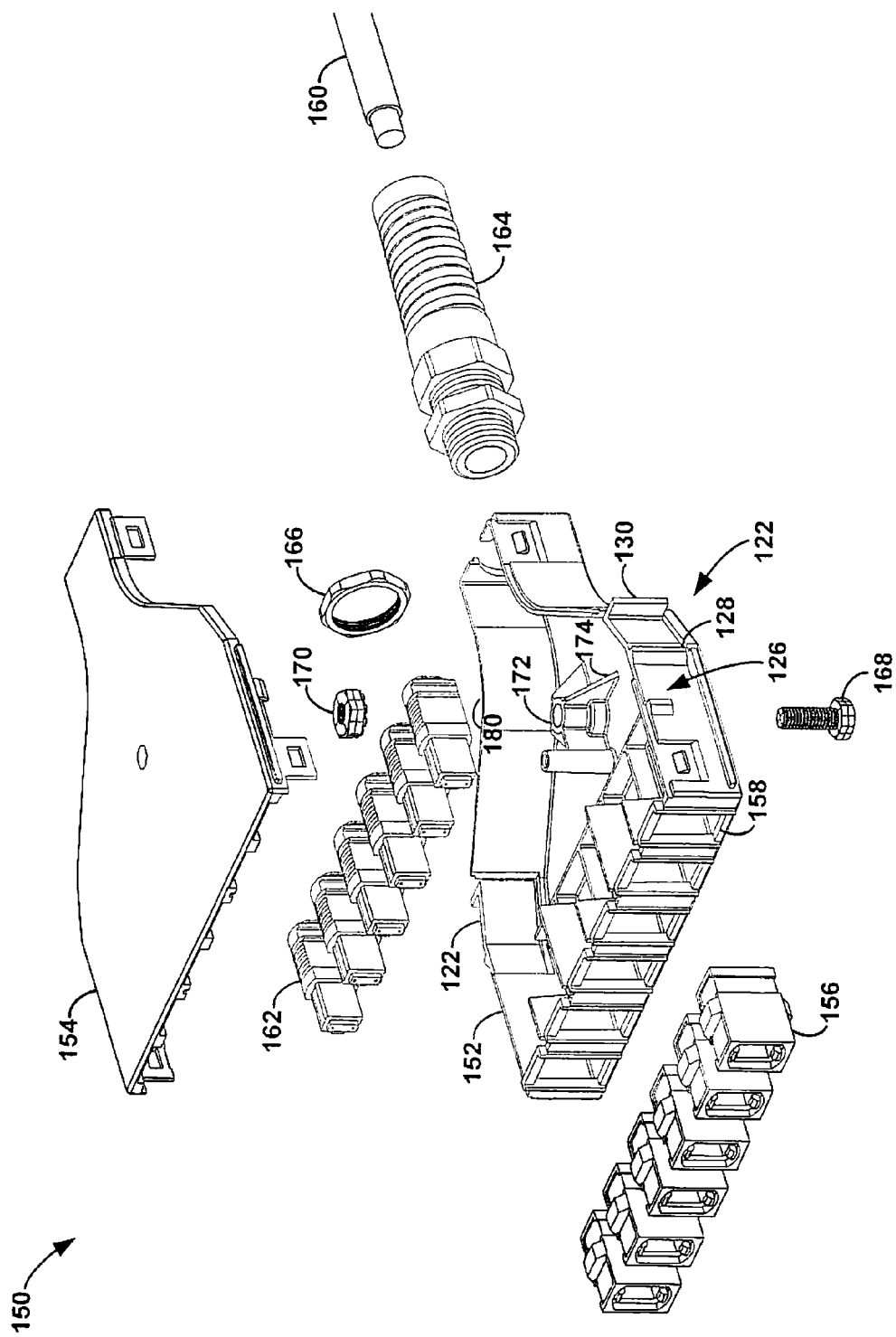
FIG. 19 illustrates an exploded rear perspective view of the pre-terminated, high-density MPO cable assembly of FIG. 18.

FIGS. 18-19 illustrate another embodiment of the present invention. Specifically, FIGS. 18-19 illustrate a pre-terminated, high-density Multi-Fiber Push On (MPO) cable assembly 150 in accordance with an embodiment of the invention. As depicted in FIGS. 18-19, the cassette assembly 150 includes the same release latch 122 described above in reference to pre-terminated cassette 115. Therefore, the cassette assembly 150 may be installed in the same patch panel 20 described above that both pre-terminated cassette 80 and pre-terminated cassette 115 may be installed in.

FIG. 19 depicts an exploded view of the pre-terminated, high-density MPO cable assembly 150. Cassette assembly 150 includes a base 152 and a cover 154. The base and cover may snap together. The cassette assembly 150 further includes MPO style adapters 156 that may snap into base 152. The base may include rectangular holes 158 to retain the MPO style adapters 156. The rectangular holes 158 may receive and lock the MPO style adapters 156. While six rectangular holes 158 are shown, fewer holes 158 may be provided if fewer MPO style adapters 156 are needed.

A multi-fiber cable 160 may be terminated with MPO optical fiber connectors 162. The fiber connectors 162 may be mated to the MPO style adapters 156 when the connectors and adapters are installed in the base 152. The cable 160 may be attached to the base 152 with a strain relief fitting 164 and retaining nut 166. The strength members of the cable 160 may preferably be attached to the base with a screw 168 and nut 170. The base may contain a boss 172 that provides a hole for the screw 168. Further, gussets 174 may be added to the boss 172 for additional strength. Attaching the strength member to the base preferably provides additional pull strength required during field cable installation.

Cassette assembly 150 may also include an angled profile 180 at the rear of the cassette. Angled profile 180 may operate to provide clearance for insertion and removal of cassettes into a populated patch panel. This is advantageous for a variety of reasons. For instance, a customer may reach between cassettes to take out an individual cassette without disturbing other cassettes. Further, the angled profile 180 may provide additional grip for a customer to grasp while inserting or removing cassette 150 from patch panel 20. The angled profile 180 may allow a customer to avoid the need to grasp the cable 160 in order to assist with removal from a patch panel. In addition, because cassette assembly 150 has the angled profile, it is not essential to include the wall extension 134 to provide additional grip. However, it should be understood that cassette assembly 150 may include the wall extension 134 to provide additional grip.

As discussed above, the cassette assembly 150 may be installed in a patch panel, such as patch panel 20. Cassette assembly 150 having release latch 122 may also be used with an angled patch panel or with a high density patch panel. For example, in a preferred embodiment, the cassette assembly 150 may be installed in the angled patch panel 120 illustrated in FIG. 10. Due to the angled profile 180 of the cassette assembly 150, a cassette may be inserted into a populated angled patch panel 120 without being obstructed by an adjacent cassette already installed. Similarly, a cassette may be removed from a populated angled patch panel 120 without being obstructed by an adjacent cassette installed in the patch panel.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

The invention claimed is:

1. A pre-terminated cassette for installation into a patch panel, wherein the patch panel comprises a retaining feature for retaining the pre-terminated cassette, the pre-terminated cassette having a release latch to allow removal of the pre-terminated cassette from the patch panel, the release latch comprising:

a cantilever beam formed by a slot extending through a sidewall of the pre-terminated cassette, wherein a first portion of the slot is perpendicular to a second portion of the slot, wherein the cantilever beam has a hinge point that allows the cantilever beam to deflect with respect to the sidewall;

a depressing tab provided at a distal end of the cantilever beam; and a latch tab protruding from a surface of the cantilever beam between the hinge point and the depressing tab, the latch tab capable of engagement with the retaining feature of the patch panel when the pre-terminated cassette is installed in the patch panel.

2. The pre-terminated cassette of claim 1, wherein the latch tab and the retaining feature of the patch panel have shapes complementary to one another.

3. The pre-terminated cassette of claim 1, wherein the latch tab is capable of inward deflection when the depressing tab is pushed inwardly with respect to the sidewall of the cassette.

4. The pre-terminated cassette of claim 3, wherein the latch tab disengages from the retaining feature of the patch panel when the latch tab is deflected inwardly.

5. The pre-terminated cassette of claim 1, further comprising a grip surface extending from the sidewall of the pre-terminated cassette and located adjacent the depressing tab.

6. The pre-terminated cassette of claim 1, further comprising a grip surface extending from the sidewall of the pre-terminated cassette, the first portion of the slot extending from the hinge point of the cantilever beam to the grip surface and the second portion of the slot extending between the depressing tab of the cantilever beam and the grip surface.

7. The pre-terminated cassette of claim 1, wherein the pre-terminated cassette comprises a cassette base and a cassette cover.

8. The pre-terminated cassette of claim 7, wherein the cantilever beam is formed by a slot in a sidewall of the cassette cover.

9. The pre-terminated cassette of claim 7, wherein the cantilever beam is formed by a slot in a sidewall of the cassette base.

10. The pre-terminated cassette of claim 1, wherein the release latch is self-energizing.

11. The pre-terminated cassette of claim 1, wherein the pre-terminated cassette is a pre-terminated, high density Multi-Fiber Push On cable assembly.

12. The pre-terminated cassette of claim 11, wherein the pre-terminated, high density Multi-Fiber Push On cable assembly comprises an angled profile along a surface of the pre-terminated, high density cable assembly.

13. A pre-terminated cassette for installation into a patch panel, wherein the patch panel comprises a retaining feature for retaining the pre-terminated cassette, the pre-terminated cassette having a release latch to allow removal of the pre-terminated cassette from the patch panel, the release latch comprising:

a cantilever beam formed by a slot extending through a sidewall of the pre-terminated cassette, wherein the cantilever beam has a hinge point that allows the cantilever beam to deflect with respect to the sidewall;

a depressing tab provided at a distal end of the cantilever beam; and a latch tab protruding from a surface of the cantilever beam between the hinge point and the depressing tab, the latch tab capable of engagement with the retaining feature of the patch panel when the pre-terminated cassette is installed in the patch panel, wherein the pre-terminated cassette comprises a cassette base and a cassette cover, wherein the cassette base comprises at least one interior rib with a notch therein, the notch allowing clearance for the cantilever beam when the beam is deflected inward, and operating as a stop for the cantilever beam to prevent excessive deflection of the cantilever beam when the beam is deflected inward.

* * * * *

UNITED STATES PATENT AND TRADEMARK OFFICE
CERTIFICATE OF CORRECTION

PATENT NO. : 8,346,046 B2  Page 1 of 1
APPLICATION NO. : 13/117329
DATED : January 1, 2013
INVENTOR(S) : Matthew M. Wagner et al.

It is certified that error appears in the above-identified patent and that said Letters Patent is hereby corrected as shown below:

Title Page;
Section (75) Inventors, line 2, which reads "Alan F. Wojcik, Cedar Lake, IL" should read "Alan F. Wojcik, Cedar Lake, IN."

Signed and Sealed this
Twelfth Day of March, 2013

Teresa Stanek Rea
*Acting Director of the United States Patent and Trademark Office*